Patented Apr. 22, 1924.

1,491,040

UNITED STATES PATENT OFFICE.

RUSSELL HART, OF ALHAMBRA, CALIFORNIA.

PROCESS OF MANUFACTURING SELENIUM CELLS FOR PHOTO-ELECTRIC WORK AND CRYSTAL RADIODETECTORS.

BEST AVAILABLE COPY

No Drawing.   Application filed March 24, 1921. Serial No. 455,255.

*To all whom it may concern:*

Be it known that I, RUSSELL HART, a citizen of the United States, residing at Alhambra, in the county of Los Angeles and State of California, have invented new and useful Improvements in the Processes of Manufacturing Selenium Cells for Photo-Electric Work and Crystal Radiodetectors.

This invention has for its object, the production of a crystalline selenium film of extreme thinness and a crystal structure very sensitive to small light densities and capable of being worked at comparatively high light densities and with a minimum of the property generally known as inertia. A further object is to reduce the cost of manufacture and render possible the production of nearly uniform cells on a commercial basis. I attain these objects in the following manner.

I heat a metal hot plate of large heat capacity to a temperature of about 260 C. Any temperature over 215 C. could be used but I prefer the former temperature. If it is desired to employ any form of vacuum, a lower temperature could be used in accordance with well-known physical laws covering vapor tension. I now place about one gram of selenium upon a thin sheet of glass etc. and place it upon a hot plate and when selenium melts, I spread it over an area of said glass a little larger than area of grid to be coated with selenium. If chemically pure selenium is used difficulty may be experienced in getting selenium to stay spread over surface of glass. This can be overcome by mixing a little tellurium or other inert substance with the selenium.

I now suspend the grid, preferably of the type shown in Figure 1 of U. S. Patent No. 1,011,824, to be coated with selenium directly over and about $\frac{1}{16}$ inch above said selenium but not touching it and making no contact with the metallic hot plate except through a heat insulating substance such as glass. The vapors of the heated selenium will sublime upon the suspended grid in the red amorphous state and quickly change to the gray crystalline state in which form it is useful for photo-electric work. Any of the well known methods of annealing may now be employed but I secure goods results by simply removing the grid with tongs and allowing to cool in open air and polishing the surface of selenium by rubbing lightly with cotton and then heating again to about 175 C. and sealing while hot in a chamber containing anhydrous calcium chloride. In subliming the selenium upon the grid a certain amount of selenous acid is formed which in some classes of work might be objectionable. This can be removed by boiling the cell in distilled water and drying and sealing it in the ordinary way.

It will be apparent to any skilled person that the quantity of selenium deposited can be regulated from a mere trace to upwards of 1/1000 inch in thickness by considering the atmospheric pressure, humidity of atmosphere, temperature of atmosphere, temperature of hot plate, light flux or density, and time of exposure. Any gas or combination of gases can be used instead of air for an atmosphere but there must be some moisture present to insure the selenium crystallizing. I never have succeeded in crystallizing selenium in a perfectly anhydrous atmosphere.

By varying the atmospheric pressure, humidity and temperature and the temperature of hot plate a variety of crystal structures may be obtained.

When uniform clean grids are used and the above mentioned factors are kept at nearly constant value a nearly uniform type of cell may be expected.

Selenium cells made by depositing the selenium in this manner are unusually sensitive to small light densities and are very quick.

I claim—

1. The process which consists in subliming selenium upon a grid in the manufacture of selenium cells.

2. The process which consists in subliming red amorphous selenium upon a grid and the simultaneous crystallization of said selenium by means of heat in the manufacture of selenium cells.

3. The process which consists in subliming selenium upon a grid in an atmosphere of predetermined composition, temperature, pressure and humidity in the manufacture of selenium cells.

4. The process which consists in keeping molten seleninum at a constant temperature and causing its vapor to condense or sublime upon a grid in an atmosphere of constant composition, temperature, humidity, and pressure, in the manufacture of selenium cells.

5. The process which consists in boiling selenium cells in distilled water for the purpose of dissolving and removing any trace of selenic or selenous acid.

6. The process which consists in subliming selenium upon a grid and thereafter sealing said grid in a chamber containing anhydrous calcium chloride, in the manufacture of selenium cells.

7. The process which consists in subliming selenium upon a grid in an atmosphere of constant composition, temperature, pressure, and humidity; and in a light flux of constant quality and density; in the manufacture of selenium cells.

RUSSELL HART. [L. S.]

Signed in the presence of—
S. A. FORMAN,
H. C. MOUND.